(12) United States Patent
Burrell et al.

(10) Patent No.: US 12,505,413 B2
(45) Date of Patent: Dec. 23, 2025

(54) ENHANCED IMAGE TRANSACTION PROCESSING SOLUTION AND ARCHITECTURE

(71) Applicant: Fidelity Information Services, LLC, Jacksonville, FL (US)

(72) Inventors: Hugh Cayford Burrell, Moraga, CA (US); Adriaan Debruin, Tigard, OR (US); Walter Knight, Saratoga, CA (US); Paul Joseph Farrington, Oakland, CA (US); Kenji Spencer, Oakland, CA (US)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

(21) Appl. No.: 17/658,624

(22) Filed: Apr. 8, 2022

(65) Prior Publication Data
US 2022/0327502 A1  Oct. 13, 2022

Related U.S. Application Data

(60) Provisional application No. 63/174,995, filed on Apr. 14, 2021, provisional application No. 63/174,523, filed on Apr. 13, 2021.

(51) Int. Cl.
*G06Q 20/04* (2012.01)
*G06V 30/18* (2022.01)

(52) U.S. Cl.
CPC .......... *G06Q 20/042* (2013.01); *G06V 30/18* (2022.01)

(58) Field of Classification Search
CPC ...... G06Q 20/042; G06Q 40/12; G06Q 20/10; G06Q 30/02; G06V 30/18
(Continued)

(56) References Cited

U.S. PATENT DOCUMENTS

2006/0202012 A1*  9/2006  Grano .................. G06Q 20/042
                                                        705/45
2011/0249905 A1  10/2011  Singh et al.
(Continued)

OTHER PUBLICATIONS

"Mathematics for MAchine Learning—Important Skills You Must Possess", from www.simplilearn.com, by AVijeet Biswal, 7 pages.*
(Continued)

*Primary Examiner* — Hani M Kazimi
*Assistant Examiner* — Sanjeev Malhotra
(74) *Attorney, Agent, or Firm* — Finnegan, Henderson, Farabow, Garrett & Dunner, LLP (57) ABSTRACT

Systems and methods, and computer readable media for image transaction processing are disclosed. The method receives an input of images of documents. The method may then analyze the input using an image processing engine to determine attributes associated with the images of the documents and identify an account linked to the attributes and a transaction associated with the account. The method may also evaluate confidence level of association links between the transaction and the account based on confidence scores of the attributes that may identify a type of the attribute. The method may use the transaction and account to split the images of documents into sets of images of documents with each set of images with confidence level of an association link between the transaction and the account associated with them being greater than a threshold value.

20 Claims, 6 Drawing Sheets

(58) Field of Classification Search
USPC ..... 705/14.23, 30, 40, 45, 7.13, 7.31, 14.66, 705/309; 382/112, 137, 190; 715/753
See application file for complete search history.

(56) References Cited

U.S. PATENT DOCUMENTS

| | | | | |
|---|---|---|---|---|
| 2012/0095819 | A1* | 4/2012 | Li | G06Q 30/02 705/14.23 |
| 2012/0284105 | A1* | 11/2012 | Li | G06Q 30/02 705/14.23 |
| 2012/0303412 | A1* | 11/2012 | Etzioni | G06Q 30/06 705/7.31 |
| 2014/0056469 | A1 | 2/2014 | Esposito et al. | |
| 2014/0153830 | A1* | 6/2014 | Amtrup | G06V 30/416 382/190 |
| 2014/0279303 | A1* | 9/2014 | van Dam | G06Q 40/12 705/30 |
| 2014/0365382 | A1* | 12/2014 | Rubinstein | H04L 51/212 705/309 |
| 2015/0007022 | A1* | 1/2015 | Chen | G06F 3/0482 715/753 |
| 2015/0110362 | A1* | 4/2015 | Amtrup | G06V 30/416 382/112 |
| 2015/0117747 | A1* | 4/2015 | Smith | G06V 30/416 382/137 |
| 2015/0117748 | A1* | 4/2015 | Smith | G06V 30/416 382/137 |
| 2015/0120563 | A1* | 4/2015 | Smith | G06Q 20/10 705/45 |
| 2015/0371281 | A1* | 12/2015 | Weinsberg | G06Q 30/0269 705/14.66 |
| 2015/0379445 | A1* | 12/2015 | Wang | G06Q 10/06311 705/7.13 |
| 2016/0275465 | A1* | 9/2016 | Smith | G06Q 20/042 |
| 2016/0328610 | A1* | 11/2016 | Thompson | G06F 16/2365 |
| 2016/0379185 | A1* | 12/2016 | Smith | G06Q 20/042 705/45 |
| 2016/0379186 | A1* | 12/2016 | Smith | G06V 30/40 705/45 |
| 2016/0379190 | A1* | 12/2016 | Smith | G06Q 20/405 705/40 |
| 2017/0109606 | A1* | 4/2017 | Macciola | G06F 18/22 |
| 2017/0147894 | A1* | 5/2017 | Bekmann | G06Q 20/3276 |
| 2017/0337173 | A1* | 11/2017 | Macciola | G06V 30/224 |
| 2017/0351915 | A1* | 12/2017 | Thompson | G06V 30/413 |
| 2018/0189695 | A1* | 7/2018 | Macciola | H04N 1/40 |
| 2019/0279170 | A1* | 9/2019 | Smith | G06Q 20/042 |
| 2020/0074099 | A1* | 3/2020 | Felice-Steele | G06F 9/54 |
| 2020/0143349 | A1* | 5/2020 | Lau | G06Q 20/14 |
| 2021/0192082 | A1* | 6/2021 | Jones | G06F 21/60 |

OTHER PUBLICATIONS

International Search Report and Written Opinion, dated Aug. 16, 2022, issued by the International Searching Authority in International Patent Application No. PCT/US22/24690 (8 pages).
Extended European Search Report for European Patent No. 22788887.2 dated Feb. 12, 2025 (12 pages).
Australian Examination Report No. 1 in counterpart Australian Patent Application No. 2022258469, dated Oct. 3, 2025, 3 pages.

* cited by examiner

ENHANCED IMAGE TRANSACTION PROCESSING SOLUTION AND ARCHITECTURE

CROSS-REFERENCE TO RELATED APPLICATIONS

This application claims priority to U.S. Provisional Application No. 63/174,523, filed on Apr. 13, 2021, and U.S. Provisional Application No. 63/174,995, filed on Apr. 14, 2021, the entirety of which is hereby incorporated by reference.

TECHNICAL FIELD

The present disclosure generally relates to computerized systems and methods for automated transaction processing. In particular, embodiments of the present disclosure relate to inventive and unconventional systems relate to transaction processing solutions using an image processing architecture that semantically understands contents to determine and process transactions.

BACKGROUND

Automated transaction processing to identify the beginning and end of a business transaction from paper-based documents is a challenging task requiring different technologies, such as image processing, character recognition, and natural language processing. Transaction processing further requires domain knowledge of the business and business processes used for handling transactions such as the purchase of products/services, payments for products/services, and customer support for products/services sold and purchased. The current set of transaction processing systems are used by lockbox payment services to handle offline payments for products and services after the delivery of product or service.

Lockbox payment processing services include manual transaction processing for a specified client or specified type of transaction (service). The manual process helps identify the seller who is paid for their products or services and/or buyer who purchased a particular products or service. The manual process can review a check to identify to whom the payment is made and for what product/service. For example, a bank may provide its customers with a lockbox payment service for the client's customers to send payments for services and products offered by the bank's client. In another scenario, a service company such as an electric grid system may receive payment checks for the specific type of transaction(s) of providing electricity and other utility services. In such a case, a payment check may include the payment for the number of units of electricity or other utilities used.

In both scenarios, awareness of client (e.g., name and account number) or structure of a transaction (e.g., number of units used to calculate the payment amount) is needed in order for processing a transaction to identify the customer and the associated payment to either post amount to a bank amount or deduct an amount for utilized units of electricity. Further, existing systems may need documents pre-analyzed to process transactions into an ordered manner matching a transaction structure, which is inefficient and adds complexity and potential errors.

Such awareness requirements limit a customer from having different forms of transaction with a varied set of steps and different forms of payments to be processed without prior knowledge. Therefore, there is a need for improved methods of systems for handling a varied set of transactions without knowing the context of the transactions or the documents needed to process a transaction.

SUMMARY

One aspect of the present disclosure is directed to a system for image transaction processing. The system includes at least one non transitory storage medium comprising instructions and at least one processor executing the instructions for performing operations. The operations may include receive an input of one or more images of documents, analyze, using an image processing engine, the input to determine one or more attributes associated with the one or more images of the documents, identify an account linked to the one or more attributes, determine a transaction associated with the account, wherein contents of the transaction are determined based on the values of the one or more attributes, evaluate confidence level of association links between the transaction and the account, wherein the confidence level of association links is based on confidence scores of the one or more attributes associated with the one or more images of the documents, wherein a confidence score of an attribute identifies a type of the attribute, and split the one or more images of documents into one or more sets of images of documents based on the transaction and the associated account, wherein a set of images of documents includes images of documents with confidence level of an association link between the transaction and the account is greater than a threshold value.

Another aspect of the present disclosure is directed to a method for image transaction processing. The method comprising receiving an input of one or more images of documents, analyzing, by an image processing engine, the input to determining one or more attributes associated the one or more images of the documents, identifying an account linked to the one or more attributes, determining a transaction associated with the account, wherein contents of the transaction are based on the values of the one or ore attributes, evaluating confidence level of association links between the transaction and the account, wherein the confidence level of association links is based on confidence scores of the one or more attributes associated with the one or more images of the documents, wherein a confidence score of an attribute identifies a type of the attribute, and splitting one or more images of documents into one or more sets of images of documents based on the transaction and the associated account, wherein a set of images of documents includes images of documents with confidence level of an association link between the transaction and the account is greater than a threshold value.

Other systems, methods, and computer-readable media are also discussed herein.

DETAILED DESCRIPTION

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for learning and predicting the structure of different transactions, different documents involved in processing transactions, identifying different types of documents, and determining statuses of transactions. A system may gain this intelligence using machine learning models that can handle varied sets of documents used in business transactions as training data to process transactions. Transaction processing may include predicting document types, transaction structures, and transaction statuses. A system with the ability to predict document types and transaction structures can associate different types of documents to transactions and determine the status of transactions.

Figure 1:
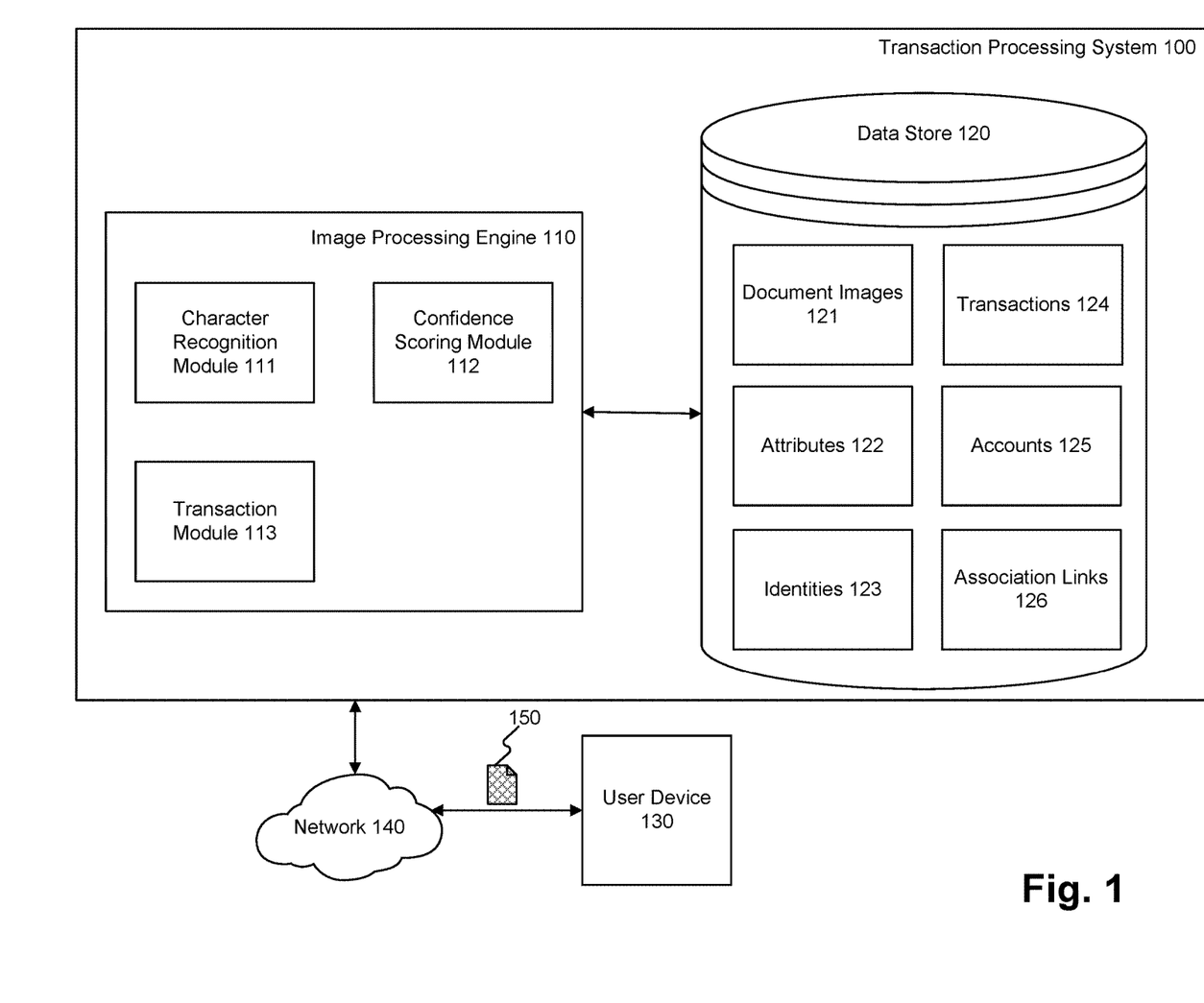
FIG. 1 is a block diagram of exemplary transaction processing system, consistent with the disclosed embodiments.

FIG. 1 is a block diagram of exemplary transaction processing system, consistent with the disclosed embodiments. As illustrated in FIG. 1, transaction processing system 100 may include image processing engine 110 and data store 120 connected with each other. Transaction processing system 100 may communicate with external devices, such as user device 130 over network 140. Transaction processing system 100 may receive requests to process transactions, for example, transaction processing request 150 from user device 130 over network 140. Transaction processing may include analyzing the contents of a document to determine document structure and, in turn, transaction structures and use these details to determine status of a transaction.

Transaction processing system 100 may utilize image processing engine 110 to process documents in data store 120 to identify and process transactions. Transaction processing may include identifying the status of transactions, association of transactions to accounts. In some embodiments, transaction processing may include processing payments for transactions. Transaction processing system 100 may map documents to various parts of a transaction after determining document types and transaction structure. Mapping documents to various parts of a transaction can help determine missing parts of a transaction that help determine the current status of a transaction.

Transaction processing system 100 processing various types of documents may receive scanned images of documents requiring parsing the text present in the document and placement of text in the document. In some embodiments, transaction processing system 100 may parse graphical elements or the placement of graphical elements in the document. For example, transaction processing system 100 may determine the presence of a postal stamp printed on or applied to a corner of an envelope to determine that a scanned image is an envelope. In another scenario, transaction processing system 100 may parse a barcode graphic or a MICR (Magnetic Ink Character Recognition) line to determine that a scanned image is a check type document. Each document in a business transaction may have a structure to present information. For example, a coupon document may include items or services for which a payment is being sent in check type document. In another scenario, document in a business transaction may be a purchase order document that includes the buyer's name and contact details along with the list of items or services requested for purchase. Transaction processing system 100 may utilize various modules of image processing engine 110 to process a scanned image of a business transaction document, such as coupon, purchase order, to determine various components of the document. Transaction processing system 100 may use that information to determine the type of the document. Transaction processing system 100 may use the content of the document found in various components of the document to identify the transaction and associated account.

Transaction processing system 100 may pass accessed documents immediately through various modules of image processing engine 110. Transaction processing system 100 may access documents from document images 121 in data store 120. In some embodiments, various modules of image processing engine 110 may process documents accessed from document images 121 through multiple iterations. Image processing engine 110 may conduct multiple iterations of transaction processing to identify various attributes that may be part of transactions. Image processing engine 110 may process access generating documents to generate multiple transactions. In some embodiments, transaction processing system 100 may split or merge previously determined transactions based on a currently processed document of document images 121.

Image processing engine 110 components may include character recognition module 111, confidence scoring module 112, and transaction module 113 to identify various components of a document and use that information to determine the document type and the items that form part of a transaction. In some embodiments, image processing engine 110 may include a graphic recognition module to recognize various non-textual elements in a document such as logos, postal stamps, barcodes etc.

Image processing engine 110, in some embodiments, may be implemented as a computer system that performs determination of transactions in image files and accounts associated with the transactions. Each component in image processing engine 110 may represent a software program function or the whole software program(s). A processor (for example, processors 316-317 of FIG. 3) can execute software functions and programs representing components in an image processing engine 110. The processor can be a virtual or physical processor of a computing device. Computing devices executing the software functions or programs may include a single processor or core or multiple processors or cores or maybe multiple computing devices spread across a distributed computing environment, network, cloud, or virtualized computing environment.

Image processing engine 110 may receive images of documents to process for determining a business transaction. Transaction processing system 100 may forward transaction processing request 150 to image processing engine 110 to determine documents to process. Image processing engine 110 may identify images of documents to process based on transaction processing request 150 shared over network 140. Image processing engine 110 may access identified images of documents from document images 121.

Image processing engine 110 may pass the accessed document images to character recognition module 111 to understand the contents of accessed document images (e.g., document images 121). In some embodiments, character recognition module 111 may process document images included in transaction processing request 150. In some embodiments, transaction processing request 150 may include a subset of document images to be processed by character recognition module 111. Character recognition module 111 may access other document images from document images 121.

Character recognition module 111 may include a feature to extract text elements from an image of an accessed document of document images 121. Character recognition module 111 may identify relationships between extracted text elements. Character recognition module 111 may include a machine learning model to help extract text elements and identify relationships between text elements. A machine learning model which is part of character recognition module 111 may improve performance to extract content from document images 121 by prior training. In some embodiments, the machine learning model of character recognition module 111 may be trained using previously processed images of documents. Transaction processing system 100 may provide training by randomly selecting images of documents from document images 121 and providing them as input in randomized order for helping process transactions by identifying text elements and their relationships.

Character recognition module 111 may identify the type of document input as a document image prior to extracting text elements. In some embodiments, character recognition module 111 may extract some text elements to identify the document type and, in turn, extract additional text elements based on document type information.

Character recognition module 111 may use document type information to understand potentially available content related to transactions in the accessed image of document and document's structure. Character recognition module 111 may use information about document structure to focus on certain portions of the accessed image of document to extract content in the form of text elements.

Character recognition module 111 may use extracted text elements to determine attributes present in the accessed image of document. An attribute may be considered a classification of data. For example, attributes may be names, contact information, etc., of individuals involved in a transaction. Character recognition module 111 may determine attributes in a document of document images 121 and stores them as attributes 122 in data store 120. Character recognition module 111 may determine attributes from extracted text elements based on document type information.

Character recognition module 111 may work in conjunction with confidence scoring module 112 and transaction module 113 to better extract text elements in a document image of document images 121. Transaction processing system 100 may move document image between character recognition module 111 and other modules of image processing engine 110 to continue extracting text elements.

Character recognition module 111 may utilize attributes associated with images of documents to determine document type information. Character recognition module 111 may extract an initial set of text elements and determine an initial set of attributes to determine document type information. Character recognition module 111 may then use confirmed information, such as document type, to further extract text elements and determine additional attributes associated with accessed images of documents.

Character recognition module 111 may identify and extract text elements and share with confidence scoring module 112 to generate confidence scores that a particular text element represents a particular attribute. For example, an element of text with 3-5 numbers, followed by at least 5 letters, may have a high confidence score for "address." Character recognition module 111 may determine attributes associated with accessed images of documents from extracted text elements based on confidence scores associated with different potential attributes mapped to text elements. Confidence scores of potential attributes mapped to an extracted element may depend on document type information.

For example, character recognition module 111 may extract a text element in the form of an email ID that may be considered a contact attribute to communicate and a bank account attribute to transfer and request money from the email ID. Confidence scoring module 112 may generate confidence scores for each potential attribute represented by extracted text element of accessed image of document. In this particular scenario, confidence scoring module 112 may give a higher confidence score to bank account attribute if the extracted text element is part of payment check type document. Alternatively, if accessed image of document is purchase order type document, then confidence scoring module 112 may provide a higher score to the contact attribute.

Character recognition module 111 may identify and extract text elements from a document image based on document images matching the current document image that may have been previously processed by character recognition module 111.

Character recognition module 111 may extract text elements based on a set of rules to identify specific kinds of text elements. For example, character recognition module 111 may extract text elements assumed to be the name of a business and products purchased, manufactured, or sold by the business. Character recognition module 111 may select the set of rules for identifying a set of text element types for extraction. Character recognition module 111 may identify a set of rules based on a matching document image of document images 121 previously processed by character recognition module 111. Machine learning model of character recognition module 111 may help identify matching document images of document images 121 to a currently processed image of document.

Confidence scoring module 112 may determine confidence scores of various attributes associated with accessed documents of document images 121. Confidence scoring module 112 may calculate confidence scores of a text element mapping to multiple attributes. For example, character recognition module 111 may map an extracted email address text element to contact attribute to communicate over email and user ID attribute for transferring money using a payment service. Confidence scoring module 112 may assign confidence scores to attributes based on document type information identified by character recognition module 111. In some embodiments, confidence scoring module 112 may select a text element to attribute mapping based on combined confidence scores of attributes of a document. In some embodiments, confidence scoring module 112 may depend on confidence scores of other attributes. In some embodiments, confidence scoring module 112 may depend on transactions determined by transaction module 113.

Confidence scoring module 112 may review currently identified transactions based on determined attributes of processed documents of document images 121. Confidence scoring module 112 may generate a higher confidence score for an attribute associated with extracted text elements if it can be part of a transaction determined by transaction module 113.

Transaction module 113 may determine various transactions present in a document image provided as input to image processing engine 110 as part of transaction processing request 150. Transaction module 113 may help identify transactions based on attributes determined by character recognition module 111. Transaction module 113 may consider attributes based on confidence scores assigned by confidence scoring module 112. Transaction module 113 may determine a transaction based on an initial set of attributes determined from documented requested for processing by transaction processing request 150.

In some embodiments, transaction module 113 may identify the boundaries of a transaction by identifying all document images related to the transaction among the document images identified by transaction processing request 150 for processing by transaction processing system 100. In some embodiments, identification of boundaries of a transaction may include generating an ordered set of documents. For example, document images of a purchase order, shipment notification, invoice, and payment check documents must be sorted in the listed order to be used as a business transaction of sale of a product/service. In some embodiments, transaction module 113 may determine the boundaries of a transaction based on all available documents that are in document images 121 and related to the transaction.

Transaction module 113 may split attributes associated with a document into separate transactions based on available documents as part of transaction processing request 150. For example, a business transaction for different items identified in a document using attributes may require payment upon successful delivery. Accordingly, attributes of items that do not have any documents that support delivery confirmation may be split into a different transaction from attributes of items with successful delivery confirmation documents.

Transaction module 113 may use supporting documents to identify the boundaries of a transaction. In the above scenario requiring payment for an item based on successful delivery, a payment check document with delivery receipts may be used by transaction module 113 to identify boundaries of a transaction to include documents listing items that have been successfully delivered.

In some embodiments, transaction module 113 may use boundary documents to determine attributes to include in transactions of transactions 124. For example, a payment check document forming a boundary of a sale transaction may include an amount that can be considered payment for a subset of purchased items listed in the purchase order. Accordingly, attributes representing items for which payment was not posted may be placed in a different transaction. In some embodiments, transaction processing system 100 may consider the transaction to be pending and wait for additional documents presenting the pending payment amount attribute to mark the transaction completed.

In some embodiments, transaction module 113 may use a single document to identify a transaction. For example, a payment check document to a certain account identified by name attribute without any supporting documents could still be regarded as a transaction. Transaction module 113 may use information associated with the memo attribute of the payment check document to identify items or activities for which the payment is made and process payment transaction for identified activities. Transaction module 113 may consider depositing money even without any information associated with the memo attribute as a transaction for money transfer. In some embodiments, transaction module 113 may use different attributes of the current document to match against attributes (e.g., attributes 122) obtained from previous documents to identify the transaction.

Transaction module 113 may store identified transactions based on determined attributes in document images 121 as transactions 124. Image processing engine 110 may also store other intermediary outputs such as attributes determined by character recognition module 111 with the help of confidence scoring module 112 in data store 120 as attributes 122. Data store 120 may also include input such as document images 121. In some embodiments, certain intermediary inputs for transaction processing such as accounts 125 may also be stored in data store 120.

In various embodiments, data store 120 may take several different forms. For example, data store 120 may be an SQL database or NoSQL database, such as those developed by MICROSOFT™, REGIS, ORACLE™, CASSANDRA, MYSQL, various other types of databases, data returned by calling a web service, data returned by calling a computational function, sensor data, IoT devices, or various other data sources. Data store 120 may store data that is used or generated during the operation of applications, such as character recognition module 111 confidence scoring module 112, and transaction module 113. For example, if region transaction module 113 is configured to process transactions, data store 120 may provide attributes 122 and identities 123 as information about the content of documents (e.g., document images 121) and meta-information about documents. In some embodiments, data store 120 may be fed data from an external source, or the external source (e.g., server, database, sensors, IoT devices, etc.) may be a replacement.

Document images 121 may include image files of various documents of various activities. For example, document images 121 may include images of documents that include an activity such as a bill, receipt, invoice, and a monthly statement. In some embodiments, document images 121 may group documents by type as recognized by character recognition module 111 using attributes associated with document images 121. In another example, transaction processing system 100 may group document images 121 as unprocessed and processed documents. Processed documents of document images 121 may include meta-information such as document type and links to attributes of attributes 122. Document images 121 may be received as part of transaction processing request (e.g., transaction processing request 150) and stored in data store 120.

Image processing engine 110 performing transaction processing may determine attributes 122 in document images 121. Attributes 122 may be associated with multiple documents of document images 121. Attributes 122 may be a consensus of various versions of attributes as identified from text elements extracted by character recognition module 111 from document images 121. For example, a name attribute may be presented differently in different document images with different order of first and last names, with only initials for first name, last name, or middle names. A consensus candidate for name attribute as determined by image processing engine 110 may be stored in attributes 122.

In some embodiments, a consensus among various versions of attributes determined by character recognition module 111 may be based on confidence scores associated with attributes provided by confidence scoring module 112. Confidence scoring module 112 may determine confidence score of an attribute associated with a document based on other attributes associated with the document.

In some embodiments, a consensus among various versions of attribute determined by image processing engine 110 may be based on prior information of the attribute or consensus among similar versions of a different attribute performed by character recognition module 111.

In some embodiments, attributes of attributes 122 associated with text elements extracted from documents of document images 121 may be based on document type determined by character recognition module 111. Transaction processing system 100 may include minimum attributes set expected per each document type. For example, transaction processing system 100 processing a payment check type document may look for a minimum attribute set of payable account, amount, and date. Transaction processing system 100 may also include an optional memo attribute. Character recognition module 111 extracting text elements from documents of document images 121 may map extracted text elements to a known set of attributes associated with documents. Character recognition module 111 may rely on keywords to identify the known set of attributes associated with document types.

Character recognition module may grouping together multiple attributes of attributes 122 associated documents currently processed by image processing engine 110 to determine identities 123. Identities 123 may uniquely identify currently processed documents identified by transaction processing request 150 or portions of currently processed documents or other entities present in the documents. For example, in a document image of an invoice, attributes determined by character recognition module 111 may be line items of various products purchased from a particular vendor, and identity may be the purchase list that includes these various attributes. In another example, various unrelated attributes such as name, address, phone number, and email ID may be combined together to form a contact identity.

Identities 123 may include mappings between different attributes. For example, a purchase order document may include the purchase order number stored as an attribute in attributes 122 that is mapped to an invoice number in an invoice document to form a sale identity. Character recognition module 111 may determine identities 123 based on matching attributes between different documents. For example, purchase order and invoice documents described above can list the same set of products/services requested and provided, resulting in the linking of the purchase order and the invoice attributes and create a sale identity. Identities 123 obtained from mapping attributes of attributes 122 may include combined values of attributes.

Image processing engine 110 may use attributes of attributes 122 to identify transactions 124. Transactions 124 may include a list of documents of document images 121 that form a single transaction. Documents that are part of a transaction of transactions 124 may be connected using attributes identified in the document images. In some embodiments, values of the attributes of attributes 122 associated with documents may be used to link documents that are part of a transaction. Different attributes may be used to link different sets of document mages forming a transaction. For example, documents related to purchase order, invoice, and payment check documents that are part of a transaction can be connected together for a transaction based on common attributes such as purchased items listed in purchase order and invoice document images. The payment check may be connected to the purchase order and invoice using the common seller and buyer names and other contact information.

Transactions 124 may also include information related to the boundaries of transactions. Transaction module 113 may defined boundaries of transactions 124 by ordering the list of document images related to a transaction. In some embodiments, transaction module 113 may define boundaries based on attributes of documents that are part of a transaction.

In some embodiments, a single document image may be part of different transactions. For example, a buyer can provide two different purchase orders a single payment check document image to transaction processing system 100 to determine two separate transactions for two different purchase orders with payment check document included in both transactions.

Transaction processing system 100 may identify accounts 125 based on attributes of attributes 122 determined from processed documents of document images 121. In some embodiments, transaction processing system 100 may use identities of identities 123 to identify accounts 125. Accounts 125 may include multiple identities that are unique across transactions. Transaction processing system 100 may also identify accounts 125 based on certain well known keywords associations in documents of document images 121. Transaction processing system 100 may extract text elements following the known keywords to generate attributes of attributes 122. In some embodiments, the association of keywords with accounts 125 is based on document type information determined by character recognition module 111. For example, a payment check type document with the keyword "payable to" can be considered to include the account details. In some embodiments, multiple keywords together may be considered for identifying attributes and, in turn, accounts. For example, an invoice type document with "account number" and "routing number" together may represent an account.

In some embodiments, existing accounts may be looked up to be associated with a document image. Accounts of accounts 125 may be looked up using identities of identities 123 associated with image of a document currently being processed by image processing engine 110.

Association links 126 may include links between transactions 124 and accounts 125. Association links 126 may also include information about the level of confidence to link a transaction to an account. The confidence level value is a combination of confidence scores of the various attributes used to identify an account or transaction. In some embodiments, confidence scoring module 112 may determine confidence levels of association links. Transaction processing system 100 may define threshold values of confidence levels for various document types and transactions. In some embodiments, a user may define threshold value and share with transaction processing system 100 as part of transaction processing request 150.

Image processing engine 110 may generate association links 126 to associate a transaction determined from currently processed documents with existing accounts of accounts 125. In some embodiments, a new account may be created using image processing engine 110 before linking to a transaction using association links. In some embodiments, an account of accounts 125 may be looked up based on attributes in the document image used as part of a transaction.

User device 130 may make a request to process unordered images of documents of document images 121 for transactions of transactions 124 to the modules in image processing engine 110. Modules (e.g., character recognition module 111) in image processing engine 110 may execute one or more functions to retrieve data requested to be processed by user device 130. The execution of the functions may result in database access requests sent by the modules in image processing engine 110 to other modules within it. In addition, in some embodiments, modules in image processing engine 110 may be accessed by other automated applications without the direct involvement of a user. This may occur, for example, in IoT (Internet of Things) environments, virtualized computing environments (e.g., involving instantiated virtual machines, containers, or serverless code instances), or in other environments involving application-to-application communications.

In some embodiments, user device 130 may be a scanner (e.g., a flat-bed scanning device, a sheet-fed scanning device, a camera, or the like). User device 130 may scan a collection of documents in an envelope and send the scanned images of the collection of documents as transaction processing request 150. User device 130 may scan multiple envelopes including multiple collections of documents and may send them as transaction processing request 150. User device 130 may scan for a set time period before sending scanned images of collections of documents as transaction processing request 150. In some embodiments, user device 130 may comprise a scanner or may otherwise be connected to a scanner.

User device 130 may forward transaction processing requests to transaction processing system 100 over network 140. The requests for information in data store 120 may also optionally be received via network 140. Network 140 may take various forms. For example, network 140 may include or utilize the Internet, a wired Wide Area Network (WAN), a wired Local Area Network (LAN), a wireless WAN (e.g., W MAX), a wireless LAN (e.g., IEEE 802.11, etc.), a mesh network, a mobile/cellular network, an enterprise or private data network, a storage area network, a virtual private network using a public network, or other types of network communications. In some embodiments, network 140 may include an on-premises (e.g., LAN) network, while in other embodiments, network 140 may include a virtualized (e.g., AWS™, Azure™, IBM Cloud™, etc.) network. Further, in some embodiments, network 140 may be a hybrid on-premises and virtualized network, including components of both types of network architecture.

User device 130 may send a transaction processing request 150 over network 140 to transaction processing system 100. Transaction processing request 150 may include details of documents to be processed by transaction processing system 100. In some embodiments, transaction processing request 150 may include scanned images of documents to be processed by transaction processing system 100. Transaction processing system 100 upon receiving transaction processing request 150 over network 140 may begin processing documents to determine transactions to be handled.

In some embodiments, transaction processing request 150 may include a request to process all unprocessed documents present in document images 121. In some embodiments, transaction processing request 150 may include a set of filters to select documents of document images 121. Document filters may include dates or other text found in document images 121. Transaction processing system 100 may use the set of filters to select documents from document images 121 and send them to image processing engine 110 for processing transactions.

Figure 2:
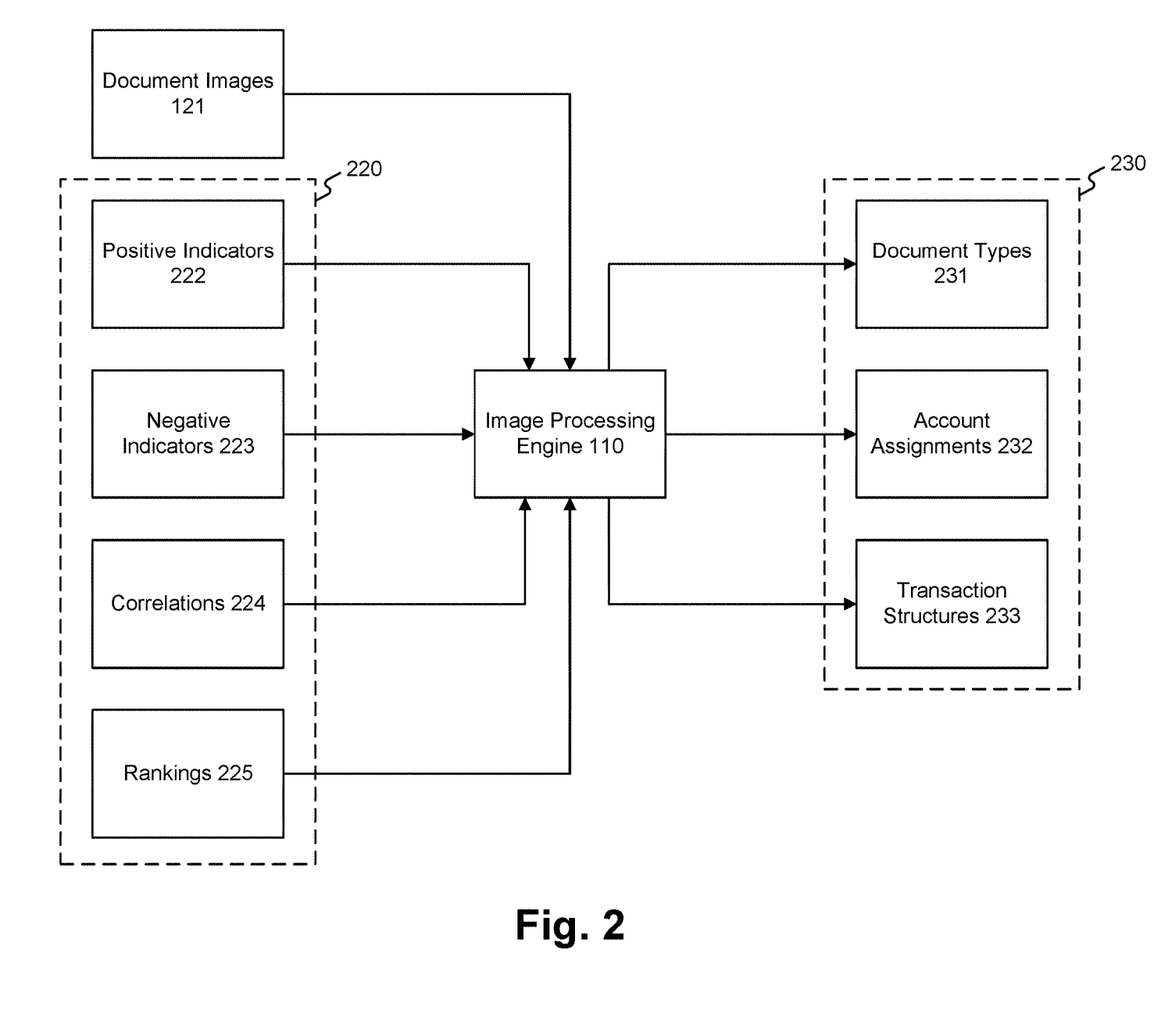
FIG. 2 is a flow diagram of an image processing engine, consistent with the disclosed embodiments.

FIG. 2 is a flow diagram of an image processing engine 110 of FIG. 1 consistent with the disclosed embodiments. As illustrated in FIG. 2, image processing engine 110 may take as input various forms of input obtained from data store 120, such as document images 121 (of FIG. 1) and intermediary data 220 generated by processing document images 121 (of FIG. 1) and other data in data store 120 (of FIG. 1) generated from previous document image processing activities.

Various modules 111-113 of image processing engine 110 and other components of transaction processing system 100 may output intermediary data 220 as part of processing transactions. Transaction processing system 100 may input intermediary data 220 back to various modules of image processing engine 110 to generate various outputs 230.

Intermediary data 220 may include meta-information associated with attributes. In some embodiments, intermediary data 220 may include meta-information generated from past iterations of transaction processing system 100. Intermediary data 220 may include meta-information directly associated with attributes, such as positive indicators 222, negative indicators 223. Intermediary data 220 may include meta-information associated with relationships between attributes, such as correlations 224. In some embodiments, intermediary data 220 may include meta-information simultaneously associated with attributes and also with relationships between attributes, such as rankings 225 showcasing ranks of individual attributes and ordering them showing relationships between attributes.

Positive indicators 222 may indicate information confirming various outputs generated using modules of image processing engine 110. Positive indicators 222 may be used to confirm a particular attribute among various attributes that need to be associated with an extracted text element from processed documents. Positive indicators 222 may also including confirming information of which attribute among various versions of attributes to be mapped to extracted text element. In some embodiments, attributes of attributes 122 with confidence scores higher than a threshold value may be considered positive indicators 222. Threshold values of confidence scores may be average, mean, or median of historical values.

Negative indicators 223 may indicate information opposing an attribute to be mapped to extracted elements. Negative indicators 223 may also include opposing information of which attributes, if considered, cannot determine identities (e.g., identities 123), transactions 124, and accounts 125. Negative indicators 223 may be confidence scores lower than threshold value. Positive indicators 222 and negative indicators 223 may be assigned to the same attributes based on transactions being determined by transaction processing system 100.

Correlations 224 may include correlation factors between different attributes (e.g., attributes 122 of FIG. 1) used for determining transaction boundaries and accounts and association links (e.g., association links 126 of FIG. 1) between transactions and accounts. Correlations 224 may include correlations between document type of processed document and attributes associated with processed documents. Correlations 224 may include correlations between different correlated attributes to help determine correlated attributes based on one attribute.

Rankings 225 may include ordering of different attributes associated with a text element extracted from a document requested for processing using transaction processing request 150. Rankings 225 may also include ordering different attributes associated with different text elements and different documents. Rankings 225 may be based on confidence scores assigned to attributes by confidence scoring module 112.

In some embodiments, rankings 225 may also include ordering of attributes to indicating the importance of attributes in a certain type of document processed by image processing engine 110 of transaction processing system 100. An ordered set of attributes based on rankings 225 may include required attributes with higher rankings and option attributes with lower rankings. In some embodiments, transaction processing system 100 may use correlations 224 in conjunction with rankings 225 to identify correlated attributes in an ordered manner.

Image processing engine 110 may generate various different outputs 230 related to a transaction including document types 231 of input document images 121, account assignments 232 associated with documents represented by document images 121, and transaction structures 233 forming transactions (e.g., transactions 124) using contents of document images 121. Various outputs 230 may be linked together. In some embodiments, outputs 230 are generated by image processing engine 110. Account assignments 232 may represent various association links (e.g., association links 126 of FIG. 1) between determined transactions accounts associated with input document images 121 processed by image processing engine 110.

Figure 3:
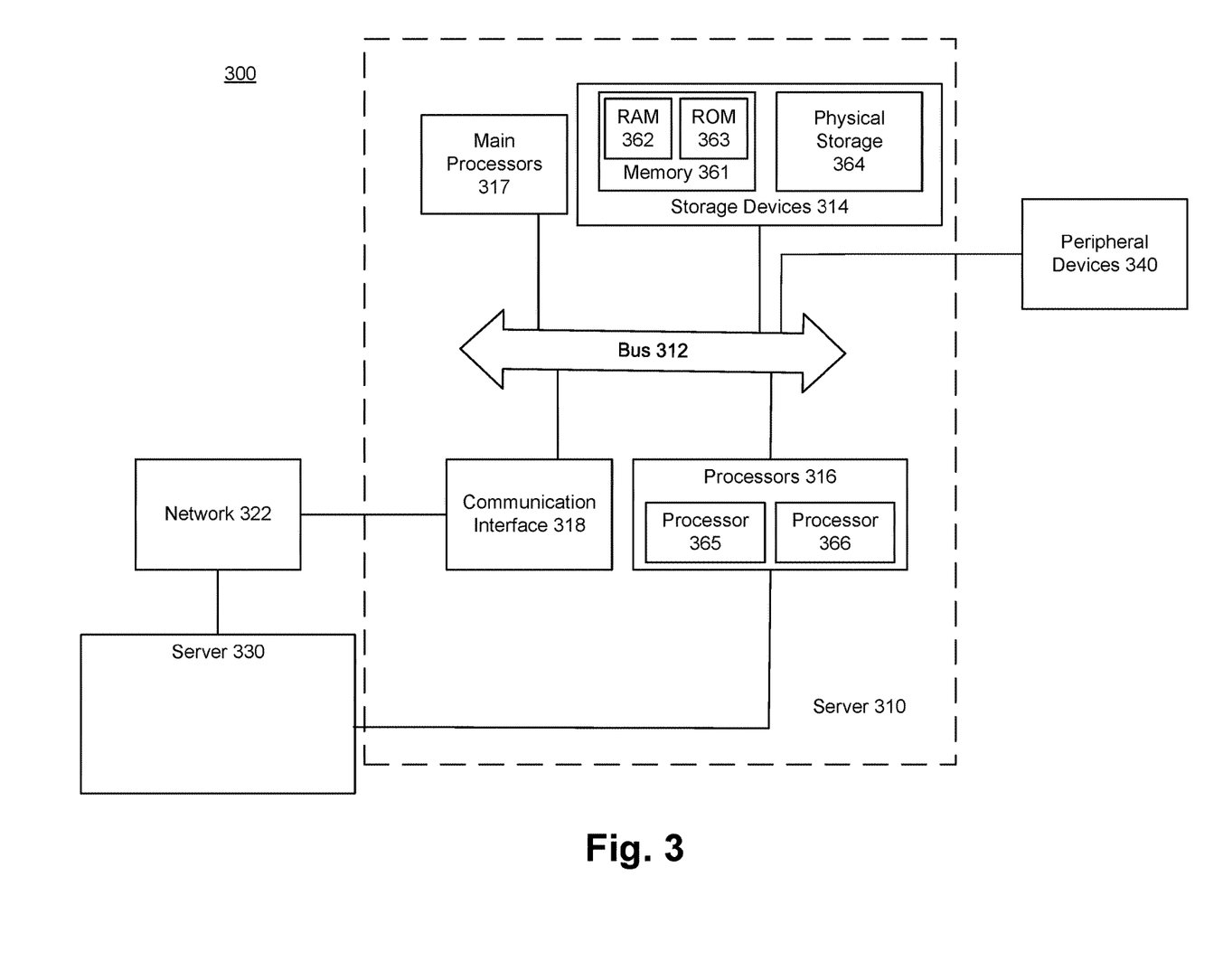
FIG. 3 illustrates a schematic diagram of an exemplary server of a distributed system, according to some embodiments of the present disclosure.

FIG. 3 illustrates a schematic diagram of an exemplary server of a distributed system, according to some embodiments of the present disclosure. According to FIG. 3, server 310 of distributed computing system 300 comprises a bus 312 or other communication mechanisms for communicating information, one or more processors 316 communicatively coupled with bus 312 for processing information, and one or more main processors 317 communicatively coupled with bus 312 for processing information. Processors 316 can be, for example, one or more microprocessors. In some embodiments, one or more processors 316 comprises processor 365 and processor 366, and processor 365 and processor 366 are connected via an inter-chip interconnect of an interconnect topology. Main processors 317 can be, for example, central processing units ("CPUs").

Server 310 can transmit data to or communicate with another server 30 through a network 322. Network 322 can be a local network, an internet service provider, Internet, or any combination thereof. Communication interface 318 of server 310 is connected to network 322, which can enable communication with server 330. In addition, server 310 can be coupled via bus 312 to peripheral devices 340, which comprises displays (e.g., cathode ray tube (CRT), liquid crystal display (LCD), touch screen, etc.) and input devices (e.g., keyboard, mouse, soft keypad, etc.).

Server 310 can be implemented using customized hard-wired logic, one or more ASICs or FPGAs, firmware, or program logic that in combination with the server causes server 310 to be a special-purpose machine.

Server 310 further comprises storage devices 314, which may include memory 361 and physical storage 364 (e.g., hard drive, solid-state drive, etc.). Memory 361 may include random access memory (RAM) 362 and read-only memory (ROM) 363. Storage devices 314 can be communicatively coupled with processors 316 and main processors 317 via bus 312. Storage devices 314 may include a main memory, which can be used for storing temporary variables or other intermediate information during execution of instructions to be executed by processors 316 and main processors 317. Such instructions, after being stored in non-transitory storage media accessible to processors 316 and main processors 317, render server 310 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 316 or main processors 317 for execution. For example, the instructions can initially be carried out on a magnetic disk or solid-state drive of a remote computer. The remote computer can load the instructions into its dynamic memory and send the instructions over a telephone line using a modem. A modem local to server 310 can receive the data on the telephone line and use an infra-red transmitter to convert the data to an infra-red signal. An infra-red detector can receive the data carried in the infra-red signal, and appropriate circuitry can place the data on bus 312. Bus 312 carries the data to the main memory within storage devices 314, from which processors 316 or main processors 317 retrieves and executes the instructions.

Transaction processing system 100 or one or more of its components may reside on either server 310 or 330 and may be executed by processors 316 or 317. Image processing engine 110 or one or more of its components may also reside on either server 310 or 330. In some embodiments, the components of transaction processing system 100 and/or image processing engine 110 may be spread across multiple servers 310 and 330. For example, image processing engine 110 components 111-113 may be executed on multiple servers.

Figure 4:
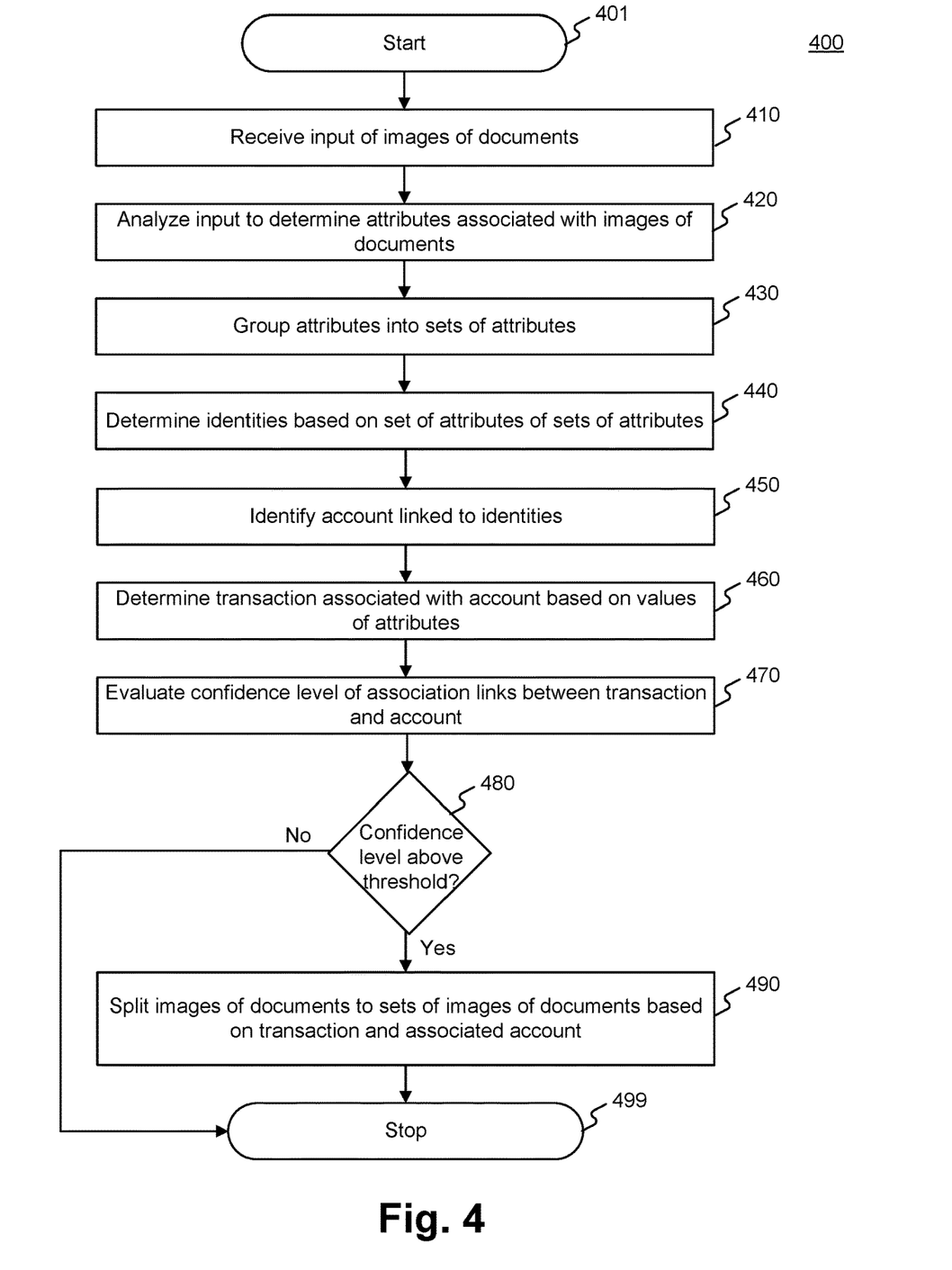
FIG. 4 is an illustrative flow chart of a method for determining transactions in a set of document images using transaction processing system of FIG. 1, consistent with the disclosed embodiments.

FIG. 4 is an illustrative flow chart of a method for determining transactions in a set of document images using transaction processing system 100 of FIG. 1, consistent with the disclosed embodiments. In some embodiments, the steps of method 400 may be performed by transaction processing system 100 executing on or otherwise using the features of distributed computing system 300 (of FIG. 3) for purposes of illustration. It will be appreciated that the illustrated method may be altered to modify the order of steps, or further include additional steps.

In step 410, transaction processing system 100 may receive as input images of documents (e.g., document images 121 of FIG. 1) for identification of transactions as part of processing transactions. Transaction processing system 100 may receive input document images as part of transaction processing request 150 (of FIG. 1) over network 140 (of FIG. 1). In some embodiments, transaction processing system 100 may receive a listing of documents images of document images 121 (of FIG. 1) to be processed using image processing engine 110. In some embodiments, transaction processing system 100 may receive filters to access document images. Transaction processing system 100 may access input images of documents from document images 121 of data store 120 based on transaction processing request 150.

In step 420, transaction processing system 100 may analyze input of document images to determine attributes (e.g., attributes 122 of FIG. 1) associated with document images from step 410. Transaction processing system 100 may extract text elements from input images of documents from step 410 to determine attributes. In some embodiments, transaction processing system 100 may use the position of text elements in images of documents to determine attributes of documents.

Transaction processing system 100 may use character recognition module 111 to extract text elements from images of documents. Transaction processing system 100 may determine document type based on positions of extracted text elements and use document type information to determine attributes associated with input images of documents.

In some embodiments, transaction processing system 100 may use document type information to look for certain keywords in extracted text elements and use them to determine attributes. Transaction processing system 100 may determine attributes with content associated with keyword matching text elements as attribute values. For example, transaction processing system 100 upon determining input document image as payment check type document can search for keywords "payable" to determine account and amount attributes from the values typed or written following "payable" keyword.

In step 430, transaction processing system 100 may group attributes into sets of attributes. Transaction processing system 100 may group attributes based on relationships (e.g., correlations 224 of FIG. 2) defined in transaction processing system 100. In some embodiments, relationships between attributes may be learned from previous iterations of transaction processing by transaction processing system 100. Transaction processing system 100 may include machine learning models that may be trained to learn different types of documents, their structure, and the relationships between various attributes that may be part of documents. Machine learning models used in transaction processing system 100 may include neural networks. In some embodiments, transaction processing system 100 components may determine document types using fuzzy logic systems.

In step 440, transaction processing system 100 may determine identities associated with document images of step 410 based on sets of attributes determined in step 430. Transaction processing system 100 may store determined identities as identities 123 in data store 120. Identities determined by transaction processing system 100 may be signals for uniquely identifying processed documents or part of the content of documents. In some embodiments, identities may help uniquely determine the account to associate the documents parsed for processing transactions associated with the documents. For example, identities of a purchase order document could include names, addresses, phone numbers, and email addresses of buyer and seller, which together may be combined to form contact identities.

In step 450, transaction processing system 100 may identify accounts associated with a document image of input document mages of step 410 based on the identities determined in step 440. For example, in purchase order and invoice documents from above, names and addresses identities of seller and buyer of product/services may be used in conjunction with a payment check document with identities of seller and buyer of products/services to identify seller account to deposit money as part of a sale transaction. Identification of an account based on identity can also help in determining if all actions related to the account have been completed.

In step 460, transaction processing system 100 may determine transactions associated with the account from step 450. Transaction processing system 100 may determine transactions based on values of attributes in document image determined in step 420.

In step 470, transaction processing system 100 may evaluate the confidence level of links associating transactions from step 460 with accounts from step 450. In some embodiments, additional transactions from transactions 124 and accounts 125 may be retrieved to generate association links (e.g., association links 126 of FIG. 1). Confidence scoring module 112 may general confidence levels of association links associating transactions from step 460 with accounts from step 450. Confidence scoring module 112 may generate confidence levels of association links using machine learning models previously trained to identify links between various transactions and accounts. Confidence scoring module 112 may use document type information determined by character recognition module 111 to determine confidence levels of association links. For example, a customer may have different accounts for handling payments for different transactions or sale of different kinds of services identified by different documents forming transactions.

In step 480, transaction processing system 100 may check whether confidence levels of the association links between transactions and accounts are above a threshold value. If the answer to the question in step 480 is No, then jump to step 499. If the answer to the question in step 480 is yes, then proceed to step 490.

Threshold values of confidence level to detect an association between transaction of transactions 124 and account of accounts 125 may be defined as part of transaction processing request 150. A user of user device 130 may define threshold values as part of transaction processing request 150.

In step 490, transaction processing system 100 may split document images into sets of document images based on association links between transactions and accounts with confidence levels greater than the threshold value. Transaction processing system 100, upon completion of step 490, completes (step 499) executing method 400 on distributed computing system 300.

Figure 5:
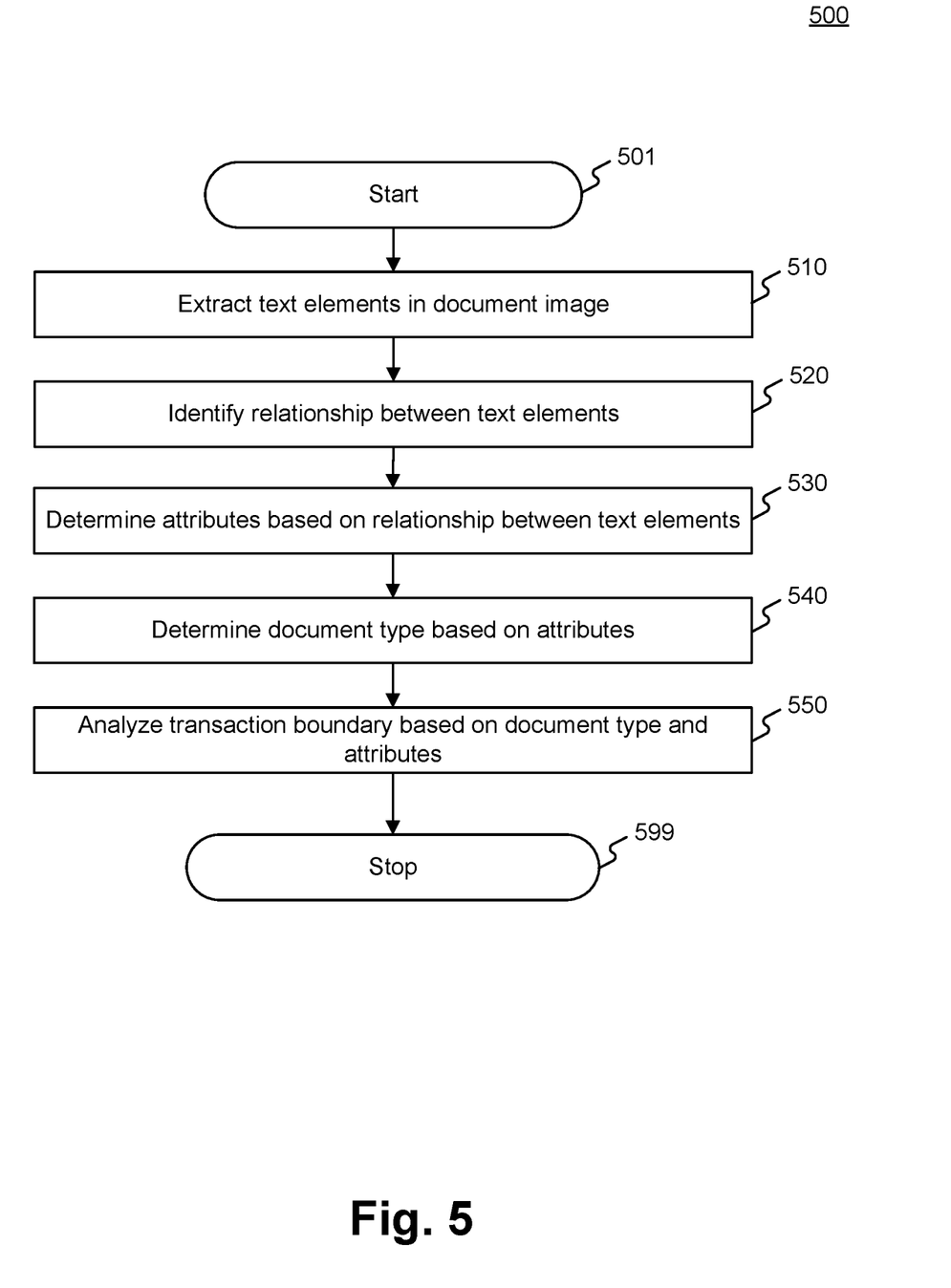
FIG. 5 is an illustrative flow chart of a method for determining attributes associated with document images, consistent with the disclosed embodiments.

FIG. 5 is an illustrative flow chart of a method for determining attributes associated with document images, consistent with the disclosed embodiments. In some embodiments, the steps of method 500 may be performed by transaction processing system 100 executing on or otherwise using the features of distributed computing system 300 for purposes of illustration. It will be appreciated that the illustrated method may be altered to modify the order of steps, or further include additional steps.

In step 510, transaction processing system 100 may extract text elements in a document image. Transaction processing system 100 may obtain document image based on transaction processing request 150 identifying document images in document images 121 or from the transaction processing request 150 itself. Transaction processing system 100 may employ character recognition module 111 to extract text elements from document image. A detailed description of character recognition module 111 extracting text elements is provided in the description of FIG. 1 above. In some embodiments, transaction processing system 100 may utilize image processing engine 110 to parse graphical elements from document image and use them in determination of document type.

In step 520, transaction processing system 100 may identify relationships between various text elements extracted in step 510. Transaction processing system 100 may directly use the position of extracted text elements and graphical elements to identify relationships between extracted text elements and graphical elements. In some embodiments, transaction processing system 100 may need secondary information to identify relationships between text and graphical elements. For example, transaction processing system 100 may utilize document type to identify relationships between text elements. Transaction processing system 100 may utilize document type to determine document structure and, in turn, look for related text elements in certain positions in the document.

In some embodiments, the contents of text and graphical elements themselves may indicate relationships between the extracted text elements. For example, a multiline address retrieved by transaction processing system 100 as text and graphical elements can be considered related based on the ordering of text elements for house number, city, state, and zip code and graphical elements such as logo or signature.

In step 530, transaction processing system 100 may determine attributes based on relationships between text and graphical elements. In the above example of multiline address, the relationship between text elements can help transaction processing system 100 determine address attribute with its value being the contents of multiple text elements.

Transaction processing system 100 may utilize the placement of text elements to determine attributes. Transaction processing system 100 may include a machine learning model trained to identify different types of documents, such as purchase orders, invoices, payment checks, money orders. Machine learning model used in transaction processing system 100 may include neural networks. In some embodiments, transaction processing system 100 components may be based on fuzzy logic.

Transaction processing system 100 may evaluate the confidence level of document type based on identified attributes. Confidence scoring module 112 may generate confidence levels of document type identification. Confidence scoring module 112 may generate confidence levels of identified document type using machine learning models trained to identify document types. Transaction processing system 100 may review further scanned images of documents if the confidence level is below a threshold value. In some embodiments, a confidence level of a document type may depend on an account associated with scanned image document and in turn transaction as described in FIG. 4 description above. For example, an account holder may only accept cashiers checks for payment and an identification of a general check may reduce confidence level of identified document type. In such cases, transaction processing system 100 may review further to identify the appropriate document type or present to user of transaction processing system 100 for secondary review.

In step 540, transaction processing system 100 may determine document type based on one or more attributes. Transaction processing system 100 may also use position and order of attributes to determine document type information.

In step 550, transaction processing system 100 may analyze transaction boundaries based on document type and attributes determined in steps 530 and 540. Transaction processing system 100 may utilize the document types to understand the type of business transaction associated with documents and accordingly sort the documents to determine the boundaries of the transaction. For example, purchase order, shipment, invoice, and payment check type documents will be ordered for processing a transaction of purchase and payment. Attributes associated with the content of a document may help further define the boundaries of a transaction by identifying which parts of the document are to be considered a complete transaction. In the above example transaction of purchase and payment, a payment amount covering a subset of items listed in invoice type document can result in a transaction boundary that includes only those items in purchase order and invoice documents with the remaining attributes associated with unpaid items included in a second incomplete transaction. Transaction processing system 100, upon completion of step 550, completes (step 599) executing method 500 on distributed computing system 300.

Figure 6:
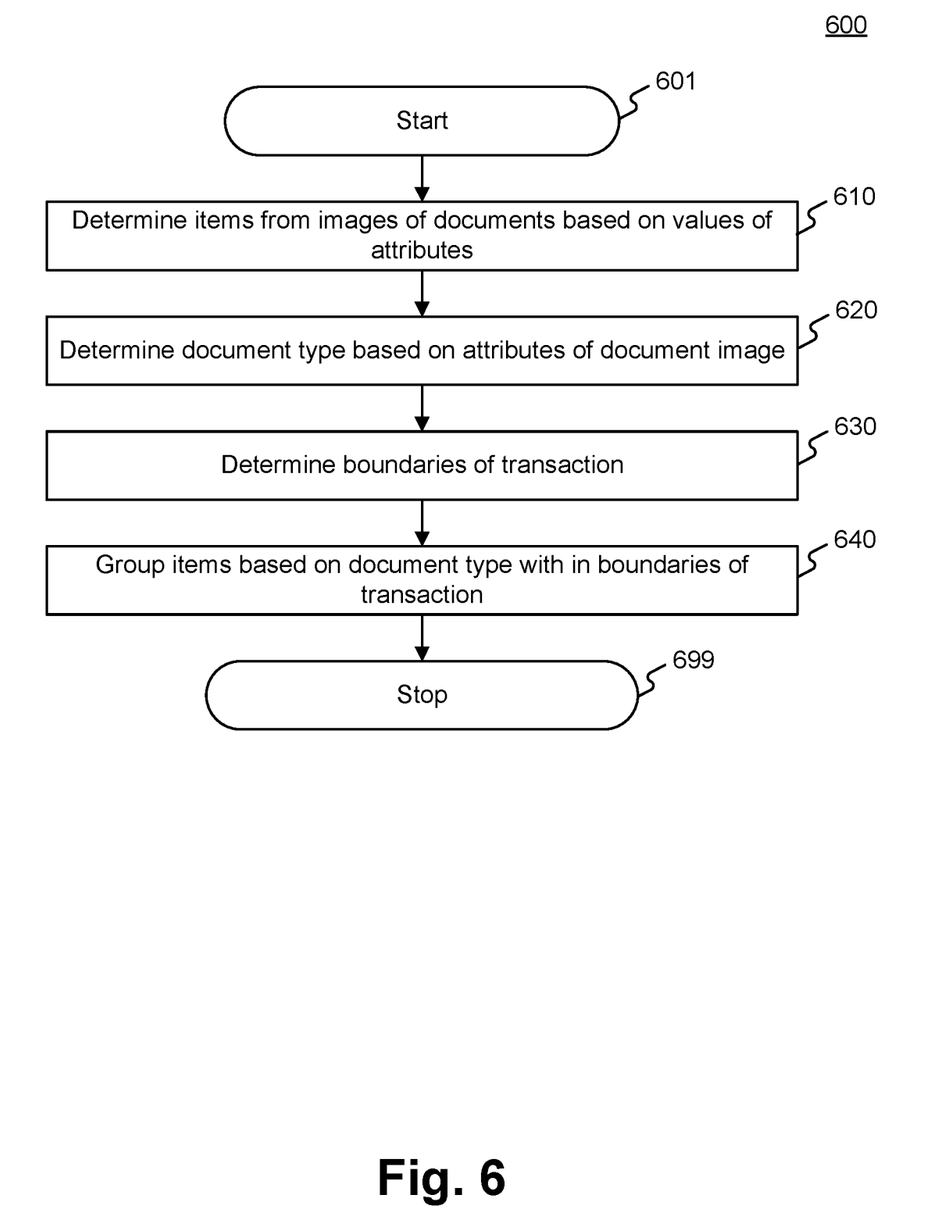
FIG. 6 is an illustrative flow chart of a method for determining transactions associated with document images, consistent with the disclosed embodiments.

FIG. 6 is an illustrative flow chart of a method for determining transactions associated with document images, consistent with the disclosed embodiments. In some embodiments, the steps of method 600 may be performed by transaction processing system 100 executing on or otherwise using the features of distributed computing system 300 for purposes of illustration. It will be appreciated that the illustrated method may be altered to modify the order of steps, or further include additional steps.

In step 610, transaction processing system 100 may determine items from document images based on values of attributes. Transaction processing system 100 may provide extracted text elements used to determine attributes as values of attributes. In some embodiments, transaction processing system 100 may process extracted text elements to generate items from extracted text elements.

In step 620, transaction processing system 100 may determine document type (e.g., document types 231 of FIG. 2) based on attributes of document image. A detailed description of document types and processes to determine document types is presented in FIGS. 1 and 2 descriptions above.

In step 630, transaction processing system 100 may determine the boundaries of a transaction. Transaction processing system 100 may determine transaction boundaries as described in method 500 of FIG. 5. Transaction processing system 100 may use document type and attributes to determine the boundaries of a transaction. Determination of boundaries of a transaction helps in understanding the attributes and, in turn, items to be included as part of processing a transaction. Transaction boundaries may be identified by specialized documents such as scanned images of envelopes. For example, a first check, followed by a first envelope, followed by two checks and a second envelope, may indicate two transactions—one with the first check and one with the second set of checks, with the envelopes acting as boundaries. Scanned images may be shared with transaction processing system 100 in an ordered manner with scanned image of envelope including documents as the last scanned image of the scanned images of a group of documents.

Transaction processing system 100 identify transaction boundaries by grouping scanned images of documents in an ordered manner. Transaction processing system 100 may evaluate the confidence level of grouping scanned images of documents to determine and confirm transaction boundaries. Confidence scoring module 112 may generate confidence levels of association of documents with each other to form a transaction with boundaries using machine learning models previously trained to group related documents. Transaction processing system 100 may review further scanned images of documents if the confidence level is below a threshold value. In some embodiments, transaction processing system may adjust transaction boundaries by splitting images into multiple groups. In some embodiments, transaction processing system 100 may present the identified group of documents within transaction boundary to user of transaction processing system 100 for secondary review In step 640, transaction processing system 100 may group items based on document type within boundaries of transaction. Transaction processing system 100 may group items to balance expenses and payments. For example, a business transaction related to the purchase of products/services may groups items related to expense amount item listed in invoice type document and payment amount item listed in payment check type document. Grouping items may help in understanding the status of a transaction. For example, a business transaction related to the purchase of products may group items related to requested products in the purchase order type document and location tracking items listed in the shipment receipt type document. Transaction processing system 100, upon completion of step 640, completes (step 699) executing method 600 on distributed computing system 300.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for image transaction processing, the system comprising:
    at least one memory storing instructions; and
    at least one processor configured to execute the instructions to perform operations comprising:
        receive an input of one or more images of documents;
        analyze, using an image processing engine, the input to determine one or more attributes associated with the one or more images of the documents;
        conduct multiple iterations of analyzing, using the image processing engine, the input to determine the one or more attributes;
        identify an account linked to the one or more attributes;
        group attributes into sets of attributes using a machine learning model, wherein the machine learning model includes a neural network trained to identify different types of documents, based on correlation factors between different attributes and a structure of the documents, using the multiple iterations of analysis;
        extract, using a character recognition module, content from the one or more images of documents to improve performance of the machine learning model wherein the improving performance comprises:
        randomly selecting the one or more images;
        inputting the randomly selected one or more images in a randomized order to the machine learning model to train the machine learning model; and
        identifying, by the machine learning model, text elements from the inputted randomly selected one or more images, thereby improving the performance of the machine learning model by improving a quality of the extracted content;
        determine a transaction associated with the account, wherein contents of the transaction are determined based on the values of the one or more attributes;
        calculate, using the machine learning model, confidence scores of the one or more attributes associated with the one or more images of the documents, wherein a confidence score of an attribute identifies a type of the attribute;
        evaluate confidence level of association links between the transaction and the account, wherein the confidence level of association links is based on the calculated confidence scores;
        split the one or more images of documents into one or more sets of images of documents based on the transaction and the associated account, wherein a set of images of documents includes images of documents with confidence level of an association link between the transaction and the account is greater than a threshold value;
        review the one or more sets of images if the confidence level of an association link between the transaction and the account is lower than a threshold value to determine whether a secondary review is needed; and
        upon determining a secondary review is needed, re-analyze, using the image processing engine, the one or more sets of images.

2. The computer-implemented system of claim 1, wherein analyzing the input further comprises:

extracting text elements in the image of the document, wherein the text elements are extracted using an image character recognition process;
identifying a relationship between the text elements; and
determining the one or more attributes based on the identified relationship between the text elements.

3. The computer-implemented system of claim 2, wherein determining the one or more attributes further comprises:
determining a document type to help analyze a boundary of the transaction, wherein the document type is based on the determined one or more attributes.

4. The computer-implemented system of claim 1, wherein identifying an account linked to the one or more attributes further comprises:
determining the one or more identities associated with the determined one or more attributes; and
identify an account linked to the one or more attributes.

5. The computer-implemented system of claim 4, wherein determining the one or more identities associated with the determined one or more attributes further comprises:
grouping one or more attributes into one or more sets of attributes; and
determining an identity of the one or more identities based on a set of attributes of the one or more sets of attributes.

6. The computer-implemented system of claim 1, wherein determining the transaction associated with the account further comprises:
determining items from the one or more images of documents identified by the image processing engine as a transaction, wherein items are values of the one or more attributes; and
grouping of the items based on document type, wherein the document type is based on one of the one or more attributes of a document image.

7. The computer-implemented system of claim 6, wherein grouping of the items based on document type further comprises:
determining boundaries of the transaction.

8. The computer-implemented system of claim 1, wherein determining the transaction associated with the account further comprises at least one of:
identifying an expenditure associated with the account;
identifying a payment associated with the account; or
identifying a payment associated with one or more transactions.

9. The computer-implemented system of claim 1, wherein splitting the one or more images of documents into one or more sets of images of documents further comprises:
determining order of one or more images of documents, wherein the order of the documents is based on document type.

10. The computer-implemented system of claim 9, wherein the order of the one or more images of documents varies based on a transaction.

11. The computer-implemented system of claim 10, wherein determining the order of one or more images of documents further comprises:
determining the order of one or more images of documents based on boundaries of the transaction.

12. The computer implemented system of claim 1, wherein the attribute type is at least one of: amount, date, or name.

13. The computer-implemented system of claim 1, wherein the at least one processor configured to execute the instructions to perform operations further comprises:
determining status of the transaction based on a split set of images of documents.

14. The computer implemented system of claim 13, wherein determining status of the transaction further comprises:
determining status of the transaction based on attributes associated with the split set of images of documents.

15. A computer-implemented method for image transaction processing, the method comprising:
receiving an input of one or more images of documents;
analyzing, by an image processing engine, the input to determining one or more attributes associated the one or more images of the documents;
conducting multiple iterations of analyzing, using the image processing engine, the input to determine the one or more attributes;
identifying an account linked to the one or more attributes;
grouping attributes into sets of attributes using a machine learning model, wherein the machine learning model includes a neural network trained to identify different types of documents, based on correlation factors between different attributes and a structure of the documents, using the multiple iterations of analysis;
extracting, using a character recognition module, content from the one or more images of documents to improve performance of the machine learning model wherein the improving performance comprises:
randomly selecting the one or more images;
inputting the randomly selected one or more images in a randomized order to the machine learning model to train the machine learning model; and
identifying, by the machine learning model, text elements from the inputted randomly selected one or more images, thereby improving the performance of the machine learning model by improving a quality of the extracted content;
determining a transaction associated with the account, wherein contents of the transaction are based on the values of the one or more attributes;
calculating, using the machine learning model, confidence scores of the one or more attributes associated with the one or more images of the documents, wherein a confidence score of an attribute identifies a type of the attribute;
evaluating confidence level of association links between the transaction and the account, wherein the confidence level of association links is based on the calculated confidence scores;
splitting one or more images of documents into one or more sets of images of documents based on the transaction and the associated account, wherein a set of images of documents includes images of documents with confidence level of an association link between the transaction and the account is greater than a threshold value;
reviewing the one or more sets of images if the confidence level of an association link between the transaction and the account is lower than a threshold value to determine whether a secondary review is needed; and
upon determining a secondary review is needed, re-analyzing, using the image processing engine, the one or more sets of images.

16. The method of claim 15, wherein analyzing, by the image processing engine, the input to determine the one or more attributes associated with the one or more images of the documents further comprises:

extracting text elements in the image processed by the image character recognition process;
identifying a relationship between the text elements; and
determining the one or more attributes based on the identified relationship between the text elements.

17. The method of claim 16, wherein determining the one or more attributes further comprises:
determining a document type to help analyze a boundary of the transaction, wherein the document type is based on the determined one or more attributes.

18. The method of claim 15, wherein identifying an account linked to the one or more attributes further comprises:
determining the one or more identities associated with the determined one or more attributes; and
identify an account linked to the one or more attributes.

19. The method of claim 18, wherein determining the one or more identities associated with the determined one or more attributes further comprises:
grouping one or more attributes into one or more sets of attributes; and
determining an identity of the one or more identities based on a set of attributes of the one or more sets of attributes.

20. The method of claim 15, wherein the machine learning model is trained to learn at least one of a document type, document structure, or a relationship between the one or more attributes of a document.

* * * * *